(12) United States Patent
Lee et al.

(10) Patent No.: US 11,138,189 B2
(45) Date of Patent: Oct. 5, 2021

(54) METHOD FOR MANAGING CONTENTS AND CLOUD SERVER FOR EXECUTING THE SAME

(71) Applicant: ASD Korea, Seoul (KR)

(72) Inventors: Sun Ung Lee, Seoul (KR); Maksim Azarov, Nizhnij Novgorod (RU)

(73) Assignee: ASD Korea, Seoul (KR)

( * ) Notice: Subject to any disclaimer, the term of this patent is extended or adjusted under 35 U.S.C. 154(b) by 281 days.

(21) Appl. No.: 16/264,999

(22) Filed: Feb. 1, 2019

(65) Prior Publication Data

US 2019/0317933 A1 Oct. 17, 2019

(30) Foreign Application Priority Data

Apr. 11, 2018 (KR) .................. 10-2018-0042411
Jan. 4, 2019 (KR) .................. 10-2019-0001090

(51) Int. Cl.
*G06F 16/23* (2019.01)
*G06F 16/2457* (2019.01)

(52) U.S. Cl.
CPC .... *G06F 16/2379* (2019.01); *G06F 16/24575* (2019.01)

(58) Field of Classification Search
CPC ............. G06F 16/2379; G06F 16/24575
See application file for complete search history.

(56) References Cited

U.S. PATENT DOCUMENTS 10,129,336 B2 * 11/2018 Shin .................. H04L 67/1097
2009/0254520 A1 * 10/2009 Clark .................. G06F 16/958

(Continued)

FOREIGN PATENT DOCUMENTS

JP        2018-049666 A      3/2018
KR    10-2013-0138140 A    12/2013

(Continued)

OTHER PUBLICATIONS

Office action dated Dec. 2, 2019 from Korean Patent Office in a counterpart Korean Patent Application No. 10-2019-0001090 (all the cited references are listed in this IDS.) (English translation is also submitted herewith.).
Notice of Allowance dated Jun. 11, 2020 from Korean Patent Office in a counterpart Korean Patent Application No. 10-2019-0001090 (all the cited references are listed in this IDS.) (English translation is also submitted herewith.).

*Primary Examiner* — Ashish Thomas
*Assistant Examiner* — Mellissa M. Ohba
(74) *Attorney, Agent, or Firm* — The PL Law Group, PLLC (57) ABSTRACT

A method for managing contents shared by a Social Network Service (SNS), executed by a cloud server which is associated with an account of the SNS. It is detected whether a first content has been newly uploaded to the SNS or whether a metadata related to the first content previously uploaded to the SNS has been newly added. A second content corresponding to the first content is searched. The cloud storage is updated by linking context information related to the first content to the second content corresponding to the first content. The cloud server interworks with an account of the SNS of each user's individual to link context information of content shared on the SNS with the content stored in the personal cloud storage, thereby enabling easier update of the cloud storage. A user may easily search for desired contents using the context information.

6 Claims, 4 Drawing Sheets

(56) References Cited

U.S. PATENT DOCUMENTS

| | | | | |
|---|---|---|---|---|
| 2014/0019497 A1* | 1/2014 | Cidon | ............... | G06F 16/182 |
| | | | | 707/827 |
| 2014/0046988 A1* | 2/2014 | Kojima | ............... | G06F 16/182 |
| | | | | 707/827 |
| 2014/0074783 A1* | 3/2014 | Alsina | ............... | G06Q 10/10 |
| | | | | 707/624 |
| 2014/0149543 A1* | 5/2014 | Maeng | ............... | H04L 67/1095 |
| | | | | 709/217 |
| 2014/0222915 A1* | 8/2014 | Roh | ............... | H04W 4/21 |
| | | | | 709/204 |
| 2015/0058287 A1* | 2/2015 | Zhang | ............... | H04L 67/1097 |
| | | | | 707/610 |
| 2015/0261775 A1* | 9/2015 | Shin | ............... | G06F 16/168 |
| | | | | 707/827 |
| 2017/0262443 A1* | 9/2017 | Cho | ............... | G06F 16/164 |

FOREIGN PATENT DOCUMENTS

| | | |
|---|---|---|
| KR | 10-2014-0013253 A | 2/2014 |
| KR | 10-2014-0081220 A | 7/2014 |
| KR | 10-2014-0100642 A | 8/2014 |
| KR | 10-2016-0016576 A | 2/2016 |

\* cited by examiner

METHOD FOR MANAGING CONTENTS AND CLOUD SERVER FOR EXECUTING THE SAME

CROSS-REFERENCE TO RELATED APPLICATION(S)

This application claims the benefit under 35 USC § 119(a) of Korean Patent Application Nos. 10-2018-0042411 filed on Apr. 11, 2018 and 10-2019-0001090 filed on Jan. 4, 2019, in the Korean Intellectual Property Office, the entire disclosure of which is incorporated herein by reference for all purposes.

BACKGROUND

1. Field

The following description relates to a technology for managing contents shared in a social network service (SNS).

2. Description of Related Art

Recently, as the use of a social network service (SNS) increases, it is increasing to share personal contents such as images and videos through SNS. In general, the user manages particular contents among various contents uploaded to the SNS by storing them in the personal cloud storage. However, as the contents to be managed increases, it is not easy to find the desired contents whenever the user wants. In addition, in some search tools, place search, face recognition, and a specific object recognition or landscape recognition in an image is possible, but a technology for the object recognition and landscape recognition has very low accuracy or quality. In addition, although some services recommend to user to describe description, comments, etc., of images in order to overcome the limitations, this approach is not desirable in the personal cloud storage and is not practical due to constraints of item accessible by a single user. In addition, when a user puts a tag in an image and stores the image in the cloud storage, it is very troublesome for user to describe redundantly a comment related to the tag.

SUMMARY

The exemplary embodiments are intended to search desired contents more easily among a large amount of contents and to improve accuracy of content search.

This summary is not intended to identify key features or essential features of the claimed subject matter, nor is it intended to be used as an aid in determining the scope of the claimed subject matter.

In one general aspect, there is provided a method for managing contents shared by a Social Network Service (SNS), executed by a cloud server which is associated with an account of the SNS, the method comprising: detecting whether a first content has been newly uploaded to the SNS or whether a metadata related to the first content previously uploaded to the SNS has been newly added; searching for a second content corresponding to the first content among a plurality of second contents stored in a cloud storage when the upload of the first content or the addition of the metadata is detected; and updating the cloud storage by linking context information related to the first content to the second content corresponding to the first content when the second content corresponding to the first content is searched.

The searching for the second content corresponding to the first content may comprise: if the first content is an image or video, determining a content as the second content corresponding to the first content, wherein the content is resized from an original of the first content, re-compressed from the original of the first content, color-corrected from the original of the first content, or filter-applied from the original of the first content.

The updating the cloud storage may comprise: receiving user information using an application program interface (API) supported by the SNS based on a token value received from the SNS; and updating the cloud storage by linking at least one of a writing date of a page in which the first content is output, a writing context in the page, a photo address, a comment, a like number, a tag, and a chatting message related to the first content with the second content corresponding to the first content through a page ID connected to the API.

The updating the cloud storage may attach the context information to the second content corresponding to the first content.

The method for managing contents shared by the SNS may further comprise: when receiving a content search request including a search word related to the context information from a user terminal, transmitting the second content linked with the context information among the plurality of second contents stored in the cloud storage to the user terminal.

The transmitting the second content linked with the context information to the user terminal may comprise: when there is a plurality of second contents linked with the context information, assigning a weight to each context information and transferring the second content having a high priority among the plurality of second contents to the user terminal.

In another general aspect, there is provided a cloud server for managing contents shared by a Social Network Service (SNS) in association with an account of the SNS, the server comprising: a detector for detecting whether a first content has been newly uploaded to the SNS or whether a metadata related to the first content previously uploaded to the SNS has been newly added; a searcher for searching for a second content corresponding to the first content among a plurality of second contents stored in a cloud storage when the upload of the first content or the addition of the metadata is detected; and a storage manager for updating the cloud storage by linking context information related to the first content to the second content corresponding to the first content when the second content corresponding to the first content is searched.

The searcher may determine a content as the second content corresponding to the first content when the first content is an image or video, wherein the content may be resized from an original of the first content, re-compressed from the original of the first content, a color corrected from the original of the first content, or a filter-applied from the original of the first content.

The storage manager may receive user information using an application program interface (API) supported by the SNS based on a token value received from the SNS, and update the cloud storage by linking at least one of a writing date of a page in which the first content is output, a writing context in the page, a photo address, a comment, a like number, a tag, and a chatting message related to the first content with the second content corresponding to the first content through a page ID connected to the API.

The storage manager may attach the context information to the second content corresponding to the first content.

The cloud server may further comprise: a request receiver to transmit the second content linked with the context information among the plurality of second contents stored in the cloud storage to a user terminal when a content search request including a search word related to the context information is received from the user terminal.

When there is a plurality of second contents linked with the context information, the request receiver may assign a weight to each context information and transfer the second content having a high priority among the plurality of second contents to the user terminal.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
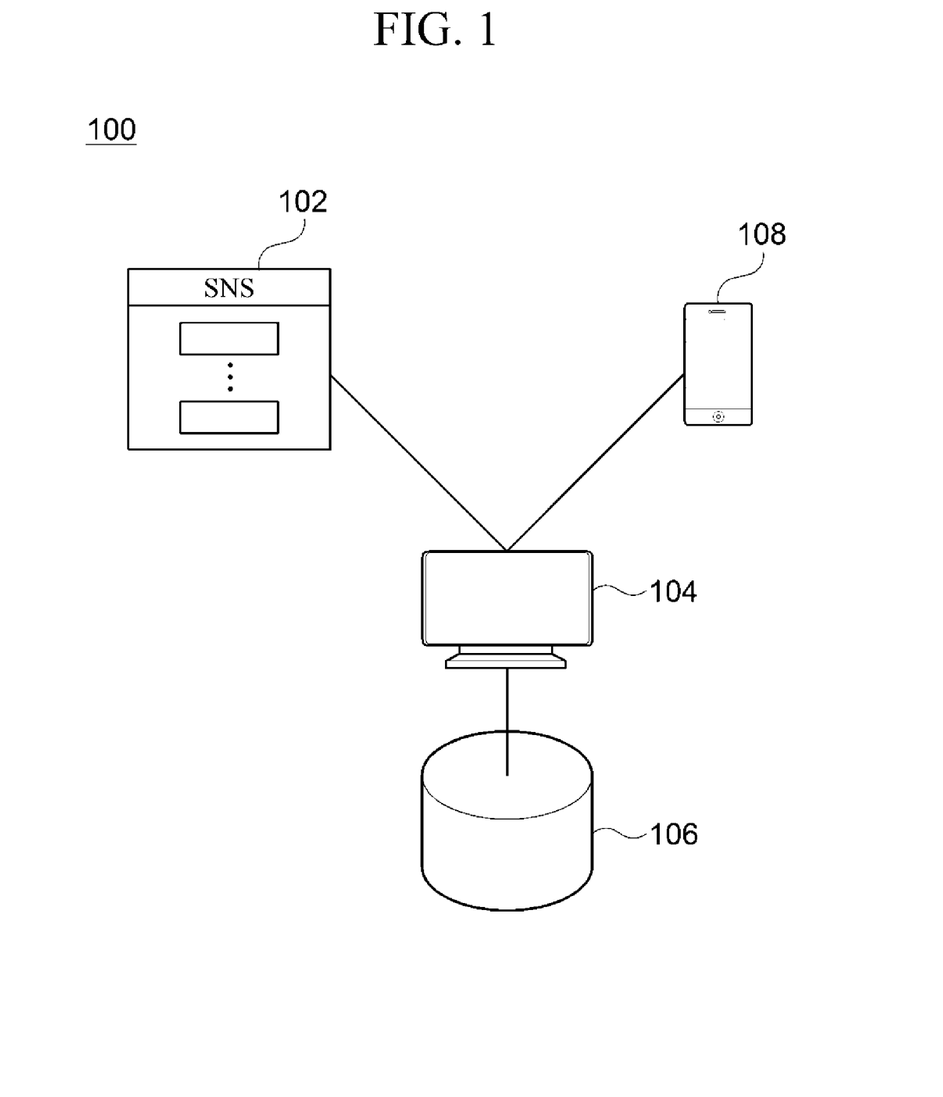
FIG. 1 is a block diagram showing a detailed configuration of a cloud system according to an exemplary embodiment.

FIG. 1 is a block diagram illustrating a cloud system 100 according to an exemplary embodiment. Referring to FIG. 1, the cloud system 100 includes a social network service (SNS) 102, a cloud server 104, a cloud storage 106, and a user terminal 108.

The SNS 102 is an online service used for content sharing, and may be, for example, Facebook, Twitter, or line. In addition, in the present exemplary embodiments, the SNS 102 is used as a wide meaning including all of a media service capable of sharing contents, a message service such as WatsApp, and the like.

The cloud server 104 provides a cloud service such as file upload/download, file sharing, file synchronization, and the like. The cloud server 104 may be connected to the cloud storage 106 and the user terminal 108 through a network (not shown). Here, the network may include the Internet, one or more local area networks, wide area networks, cellular networks, mobile networks, other types of networks, or a combination of these networks. In addition, although the cloud server 104 and the cloud storage 106 are illustrated as separate components in FIG. 1 for convenience of explanation, the cloud storage 106 may be a component of the cloud server 104.

In the present exemplary embodiment, the cloud server 104 may manage content shared on the SNS 102 by interworking with an account of the SNS 102 of each user. To this end, the account of the SNS 102 of each user may be previously connected to the cloud server 104.

The cloud server 104 may detect whether a first content is newly uploaded to the SNS 102 or whether a metadata related to the first content previously uploaded to the SNS 102 is newly added. Here, the metadata is an activity log recorded by the users of the SNS 102 in relation to the first content, and may be, for example, comments, descriptions, and like, related to the first contents. As an example, when a user uploads a new photo to the SNS 102, or another user presses on like button or writes a comment, the cloud server 104 may detect it. The cloud server 104 may automatically monitor content/metadata uploaded by using various application program interfaces (APIs) supported by the SNS 102.

If the upload of the first content or the addition of the metadata is detected, the cloud server 104 searches a second content corresponding to the first content among a plurality of second contents stored in the cloud storage 106 of the user who uploaded the first content. Specifically, the cloud server 104 may search for the second content matched with the first content among the plurality of second contents by comparing the first content, in which the upload or the corresponding metadata is detected, with the plurality of second contents stored in the cloud storage 106. In this case, the cloud server 104 may determine whether to match content by using a set image matching scheme or a video matching scheme.

For example, when the first content is an image or video, the cloud server 104 may determine that the second content is matched with the first content in the SNS 102 when the second content in the cloud storage 106 is the following.

a case of being clipped from an original of a first content     a case of being resized from an original of a first content     a case of being re-compressed from an original of a first content     a case of being color-corrected from an original of a first content     a case of being filter-applied from an original of a first content     a combination of at least part of the cases If the second content corresponding to the first content is searched, the cloud server 104 updates the cloud storage 106 by linking context information related to the first content with second content corresponding to the first content. In the present exemplary embodiments, the context information may be various information related to the first content and a page in which the first content is uploaded, for example, a writing date of a page in which the first content is output, a writing text in the page, a photo address, a comment, a like number, a tag related to the first content, and the like. However, this is merely an example, and the kind of context information is not limited thereto.

The cloud server 104 may receive user information (e.g., user name, gender, address, etc.) using an API supported by the SNS 102 based on a token value received from the SNS 102, and may link context information related to the first content with the second content corresponding to the first content through a page ID connected to the API. In this case, the cloud server 104 may attach the context information to the second content corresponding to the first content. For example, when a comment related to the first content is added on the SNS 102, the cloud server 104 may search for a second content corresponding to the first content among the second contents stored in the cloud storage 106, and may link context information (i.e., comment information) related to the first content with the searched second content. Whenever the upload of the first content or the addition of the metadata is detected, or at every predetermined period, the cloud server 104 may continuously update the cloud storage 106 by repeatedly performing the above-described process.

Thereafter, the cloud server 104 may receive a content search request including a keyword associated with the context information from the user terminal 108. The cloud server 104 retrieves the second content associated with the context information stored in the cloud storage 106 using the keyword included in the content search request and the context information corresponding the keyword. When there is a plurality of second contents linked with the context information among the second contents stored in the cloud storage 106, the cloud server 104 may assign a weight to each context information to assign priority to the plurality of second contents.

For example, the cloud server 104 may assign a weight higher than a comment of another user to a description directly input by the user in a process of assigning a weight to each context information.

As another example, the cloud server 104 may assign a higher weight than a previously input message to a recently input message in a process of assigning a weight to each context information.

The cloud server 104 may assign priority to each of the second contents linked with the context information based on weights assigned to the respective context information. Accordingly, the cloud storage 106 may transfer the second content having a high priority among the plurality of second contents to the user terminal 108, and in this case, the possibility of searching for the content to be actually searched by the user may be increased.

The cloud storage 106 is a storage in which content is stored. The cloud storage 106 may be present in one configuration of the cloud server 104 or may be connected to the cloud server 104 through a network. The cloud storage 106 may be, for example, a personal cloud storage, but is not limited thereto, and various types of storage (e.g., a local device repository used by a user, a photo/gallery storage in the user terminal 108, and the like) having a space for storing content may correspond to the cloud storage 106 according to the present embodiment. Although only one cloud storage 106 is illustrated in FIG. 1 for convenience of explanation, the cloud storage 106 may exist for each user.

The user terminal 108 may be a terminal held by a user, for example, a desktop, a notebook, a tablet computer, a smart phone, a PDA, a smart watch, and the like. The user may log in the SNS 102 through the user terminal 108 to upload the content to the SNS 102. Also, the user may search for contents stored in the cloud storage 106 through the user terminal 108. In this case, the user terminal 108 may display context information about each content stored in the cloud storage 106 to the user, and the user may easily search for desired content through the context information. In addition, when the user searches for specific contents using the context information, contents corresponding to the contexts may be displayed through the user terminal 108. That is, according to an exemplary embodiment, the user may more easily search for related contents through context information.

Figure 2:
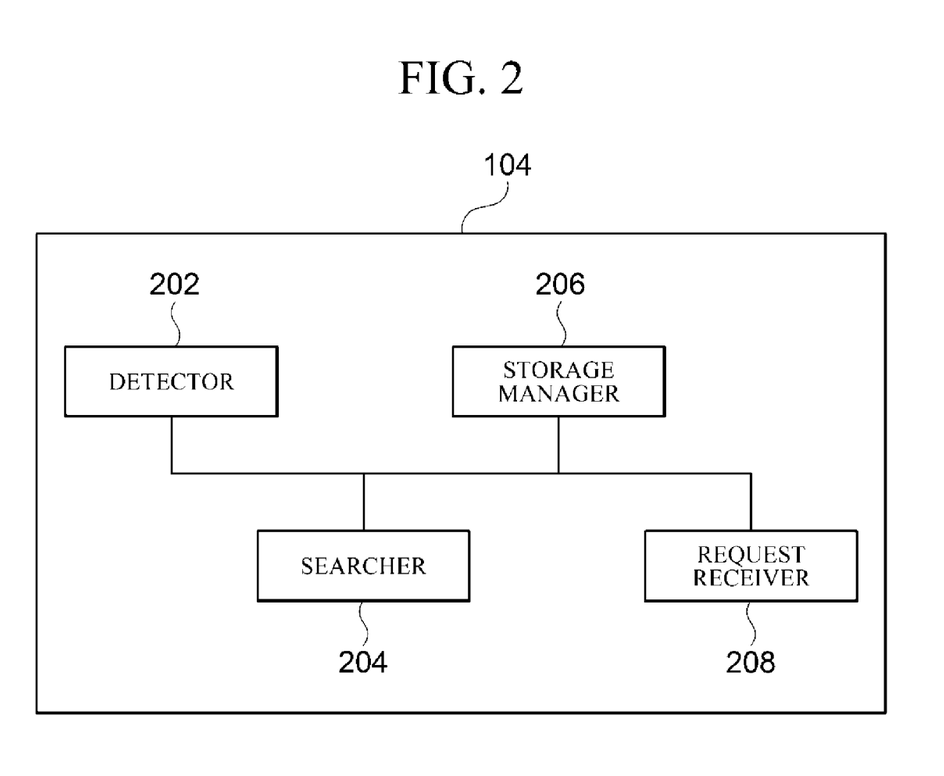
FIG. 2 is a block diagram showing a detailed configuration of a cloud server according to an exemplary embodiment.

FIG. 2 is a block diagram illustrating a detailed configuration of the cloud server 104 according to an exemplary embodiment. Referring to FIG. 2, the cloud server 104 includes a detector 202, a searcher 204, a storage manager 206, and a request receiver 208.

The detector 202 detects whether the first content is newly uploaded to the SNS 102 or whether the metadata related to the first content previously uploaded to the SNS 102 is newly added.

When the upload of the first content or the addition of the metadata is detected, the searcher 204 searches for second content corresponding to the first content among a plurality of second contents stored in the cloud storage 106. In this case, the cloud server 104 may search for the second content using the set image matching scheme, the video matching scheme, and the like. For example, when the first content is an image or video, the searcher 204 may determine a content as the second content corresponding to the first content, wherein the content is resized from an original of the first content, re-compressed from the original of the first content, color-corrected from the original of the first content, or filter-applied from the original of the first content.

When the second content corresponding to the first content is searched, the storage manager 206 updates the cloud storage 106 by linking context information related to the first content with the second content corresponding to the first content. As described above, the context information is various information related to the first content and the page in which the first content is uploaded, and may be, for example, a writing date of a page in which the first content is output, a writing text in the page, a photo address, a comment, a like number, a tag related to a tag, a chatting message related to the first content, and the like.

The storage manager 206 may receive user information using an API supported by the SNS 102 based on a token value received from the SNS 102, and acquire various context information related to the first content through a page ID connected to the API. Thereafter, the storage manager 206 may update the cloud storage 106 by linking the context information with the second content corresponding to the first content. For example, the storage manager 206 may attach the context information to the second content corresponding to the first content, generate an index, and link the first content with the second content.

Table 1 below shows an example of the context information related to the second content stored in the cloud storage 106. Such context information may be stored and managed in a separate metadata DB (not shown) in the cloud server 104. The context information and the content in the cloud storage 106 may interoperate with each other through the above-described index.

TABLE 1

| File object ID | File path | File type | Writing date |
|---|---|---|---|
| ObjectId("5acc19f34c5df63cdcbb3cf9") | /1/home/Travel/2018_03_01_Jeju_Sungsan.mp4 | Video | ISODate("2018-03-23T03:58:53.783Z") |
| ObjectId("5acc18f74c5df639456f87ff") | /1/home/Travel/DCIM/2018_03_01_8514929.jpg | Image | ISODate("2018-03-23T04:22:56.288Z") |

| File object ID | Likes | Comment | Tag | Page ID |
|---|---|---|---|---|
| ObjectId("5acc19f34c5df63cdcbb3cf9") | 31 | 6 | [Travel, Jeju, Sungsan] | 376570488117_10155135584603118 |
| ObjectId("5acc18f74c5df639456f87ff") | 12 | 10 | [Travel, Jeju, Sungsan, Family] | 376570488117_10155135711203118 |

The request receiver 208 receives a content search request including a search word associated with the context information from the user terminal 108, and transfers the second content linked with the context information among the second contents stored in the cloud storage 106 to the user terminal 108. If there is a plurality of second contents linked with the context information among the second contents stored in the cloud storage 106, the request receiver 208 may assign a weight to each of the context information and may transfer the second content having a high priority among the plurality of second contents to the user terminal 108.

Figure 3:
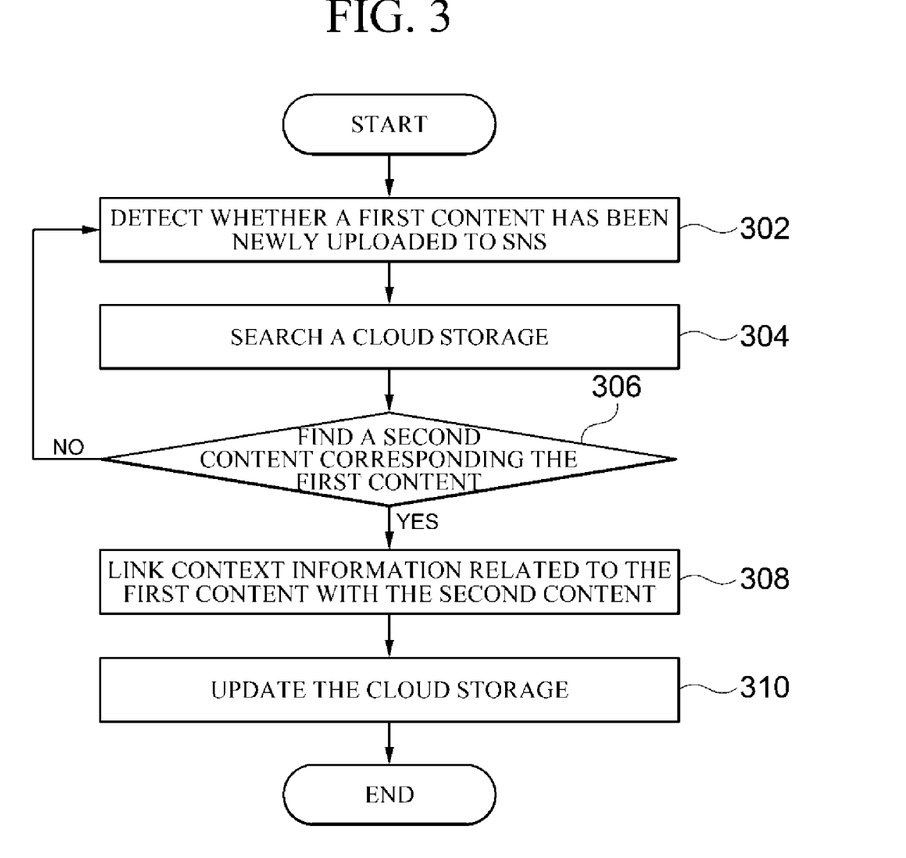
FIG. 3 is a flowchart for describing a content management method according to an exemplary embodiment.

FIG. 3 is a flowchart illustrating a content managing method according to an exemplary embodiment. In the illustrated flowchart, the method is described by dividing the method into a plurality of steps, but at least some steps may be performed by changing an order, by being combined with another step, or by being omitted, or by being divided into detailed steps.

In step 302, the cloud server 104 detects whether the first content is newly uploaded to the SNS 102 or whether the metadata related to the first content previously uploaded to the SNS 102 is newly added.

In step 304, when the upload of the first content or the addition of the metadata is detected, the cloud server 104 accesses the cloud storage 106 of the user who uploaded the first content and searches for the content.

In step 306, the cloud server 104 searches for a second content corresponding to the first content among the plurality of second contents stored in the cloud storage 106. If the second content corresponding to the first content is not searched, the process returns to the step 302 and the previous process is repeated. When the second content corresponding to the first content is searched, the step 308 is performed.

In step 308, when the second content corresponding to the first content is searched, the cloud server 104 links context information associated with the first content with the second content corresponding to the first content. For example, the cloud server 104 may attach the context information to the second content corresponding to the first content.

In step 310, the cloud server 104 updates the cloud storage 106 based on the context information. Specifically, the cloud server 104 may receive user information using an API supported by the SNS 102 based on a token value received from the SNS 102, and acquire various context information related to the first content through a page ID connected to the API. Also, the cloud server 104 may update the cloud storage 106 by linking the context information with the second content corresponding to the first content.

Thereafter, when receiving a content search request including a search word associated with the context information from the user terminal 108, the cloud server 104 may transmit the second content linked with the context information among the second content stored in the cloud storage 106 to the user terminal 108. As an example, the user may search for a photo having likes of 100 or more among the contents stored in the cloud storage 106. As another example, the user may search for a photo having a comment of 10 or more among contents stored in the cloud storage 106.

According to an exemplary embodiment, the cloud server 104 interworks with an account of the SNS of each user's individual to link context information of content shared on the SNS with the content stored in the personal cloud storage 106, thereby enabling easier update of the cloud storage. In this case, the user may easily search for desired contents among a large amount of contents stored in the cloud storage 106 using the context information, and the accuracy of searching contents may also be improved.

In addition, according to an exemplary embodiment, a weight is given to each context information to preferentially search for content having a high priority among a large amount of contents stored in the cloud storage, thereby obtaining a search result optimized for the user's personal and increasing a user satisfaction with the search result.

Figure 4:
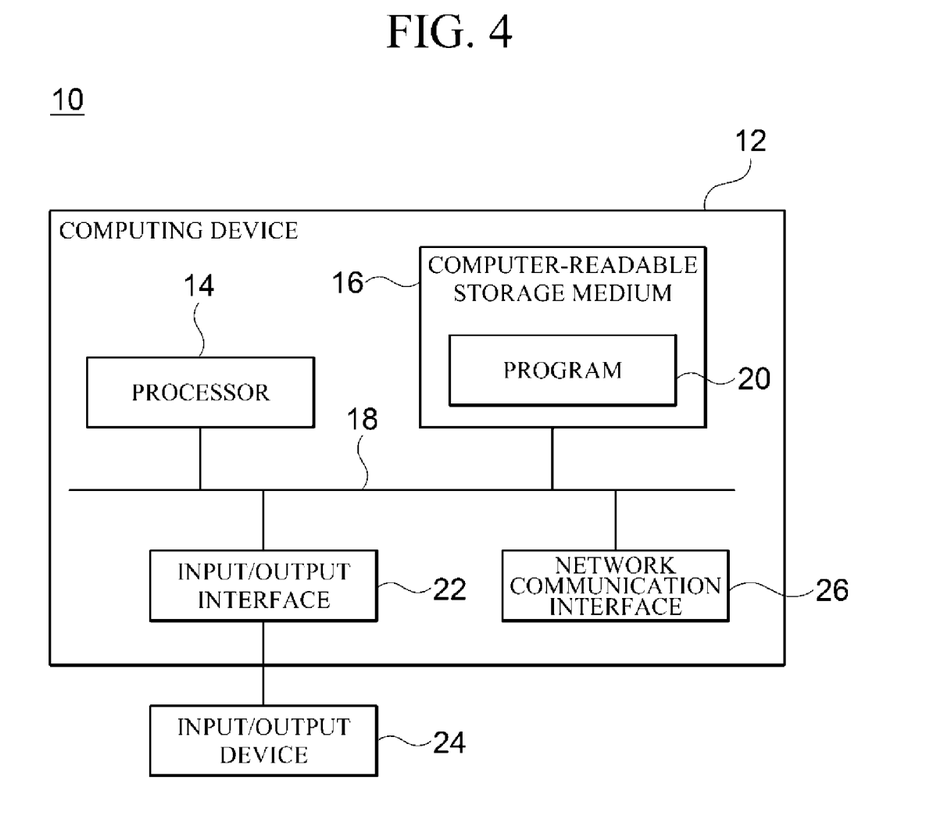
FIG. 4 is a block diagram for describing a computing environment including a computing device suitable for use in exemplary embodiments.

FIG. 4 is a block diagram illustrating a computing environment including a computing device suitable for use in exemplary embodiments. In the illustrated embodiment, each component may have different functions and capabilities than those described below, and may include additional components as well as those described below.

The computing environment 10 includes a computing device 12. In one embodiment, computing device 12 may be a cloud system 100 or one or more components included in cloud system 100.

Computing device 12 includes at least one processor 14, a computer-readable storage medium 16 and a communication bus 18. The processor 14 may allow the computing device 12 to operate according to the above-described exemplary embodiments. For example, the processor 14 may execute one or more programs stored in the computer-readable storage medium 16. The one or more programs may include one or more computer-executable instructions, and the computer executable instructions may be configured to cause the computing device 12 to perform operations according to an exemplary embodiment when executed by the processor 14.

The computer-readable storage medium 16 is configured to store computer-executable instructions, program code, program data, and/or other suitable types of information. The program 20 stored in the computer-readable storage medium 16 includes a set of instructions executable by the processor 14. In an embodiment, the computer-readable storage medium 16 may be a memory (volatile memory such as random access memory, non-volatile memory, or any suitable combination thereof), one or more magnetic disk storage devices, optical disk storage devices, flash memory devices, other types of storage media that are accessible by the computing device 12 and that can store desired information, or a suitable combination thereof.

The communication bus 18 includes a processor 14, a computer-readable storage medium 16, to interconnect other various components of the computing device 12.

Computing device 12 may also include one or more input/output interfaces 22 and one or more network communication interfaces 26 that provide an interface for one or more input/output devices 24. The I/O interface 22 and the network communication interface 26 are connected to a communication bus 18. The I/O device 24 may be connected to other components of the computing device 12 through the I/O interface 22. The input/output device 24 may include an input device such as a pointing device (e.g., a mouse or a track pad), a keyboard, a touch input device (e.g., a touch pad or a touch screen), a voice or sound input device, various types of sensor devices, an input device such as a photographing device, and/or an output device such as a display device, a printer, a speaker, and/or a network card. The exemplary input/output device 24 may be included within the computing device 12 as a component that configures the computing device 12, or may be coupled with the computing device 12 as a separate device that is distinct from the computing device 12.

Although the exemplary embodiment of the present invention has been described in detail with reference to the exemplary embodiment of the present invention, it will be understood by those skilled in the art that various modifications may be made within the scope of the present invention. Therefore, the scope of the present invention should not be limited to the described embodiments, and should be determined by the appended claims as well as the appended claims.

What is claimed is:

1. A method for managing contents shared by a Social Network Service (SNS), executed by a cloud server which is associated with an account of the SNS, the method comprising:
    detecting whether a first content has been newly uploaded to the SNS or whether a metadata related to the first content previously uploaded to the SNS has been newly added;
    searching for a second content corresponding to the first content among a plurality of second contents stored in a cloud storage when the upload of the first content or the addition of the metadata is detected;
    updating the cloud storage by linking context information related to the first content to the second content corresponding to the first content when the second content corresponding to the first content is searched; and
    when receiving a content search request including a search word related to the context information from a user terminal, transmitting the second content linked with the context information among the plurality of second contents stored in the cloud storage to the user terminal,
    wherein the updating of the cloud storage comprises:
        receiving user information using an application program interface (API) supported by the SNS based on a token value received from the SNS; and
        updating the cloud storage by linking two or more of a writing context in a page in which the first content is output, a photo address, a comment, a like number, a tag, and a chatting message related to the first content with the second content corresponding to the first content through a page ID connected to the API; and
    the transmitting of the second content comprises:
        when there is a plurality of second contents linked with the context information among the plurality of second contents stored in the cloud storage, assigning a weight to each context information and transferring the second content having a high priority among the plurality of second contents to the user terminal.

2. The method of claim 1, wherein the first content is an image or a video, and the searching for the second content corresponding to the first content comprises determining a content as the second content corresponding to the first content, wherein the content is resized from an original of the first content, re-compressed from the original of the first content, color-corrected from the original of the first content, or filter-applied from the original of the first content.

3. The method of claim 1, wherein the updating of the cloud storage comprises attaching the context information to the second content corresponding to the first content.

4. A cloud server for managing contents shared by a Social Network Service (SNS) in association with an account of the SNS, the cloud server comprising:
    at least one processor executing one or more programs stored in non-volatile computer-readable storage medium;
    a detector executed by the at least one processor for detecting whether a first content has been newly uploaded to the SNS or whether a metadata related to the first content previously uploaded to the SNS has been newly added;
    a searcher executed by the at least one processor for searching for a second content corresponding to the first content among a plurality of second contents stored in a cloud storage when the upload of the first content or the addition of the metadata is detected;
    a storage manager executed by the at least one processor for updating the cloud storage by linking context information related to the first content to the second content corresponding to the first content when the second content corresponding to the first content is searched; and
    a request receiver executed by the at least one processor to transmit the second content linked with the context information among the plurality of second contents stored in the cloud storage to a user terminal when a content search request including a search word related to the context information is received from the user terminal,
    wherein the storage manager receives user information using an application program interface (API) supported by the SNS based on a token value received from the SNS, and updates the cloud storage by linking two or more of a writing context in a page in which the first content is output, a photo address, a comment, a like number, a tag, and a chatting message related to the first content with the second content corresponding to the first content through a page ID connected to the API; and when there is a plurality of second contents linked with the context information among the plurality of second contents stored in the cloud storage, the request receiver assigns a weight to each context information and transfers the second content having a high priority among the plurality of second contents to the user terminal.

5. The cloud server of claim 4, wherein the first content is an image or a video, and the searcher determines a content as the second content corresponding to the first content, wherein the content is resized from an original of the first content, re-compressed from the original of the first content, a color corrected from the original of the first content, or a filter-applied from the original of the first content.

6. The cloud server of claim 4, wherein the storage manager attaches the context information to the second content corresponding to the first content.

* * * * *